Dec. 27, 1932.  F. H. McCORMICK  1,892,557
LIQUID HEATER
Filed Aug. 11, 1930
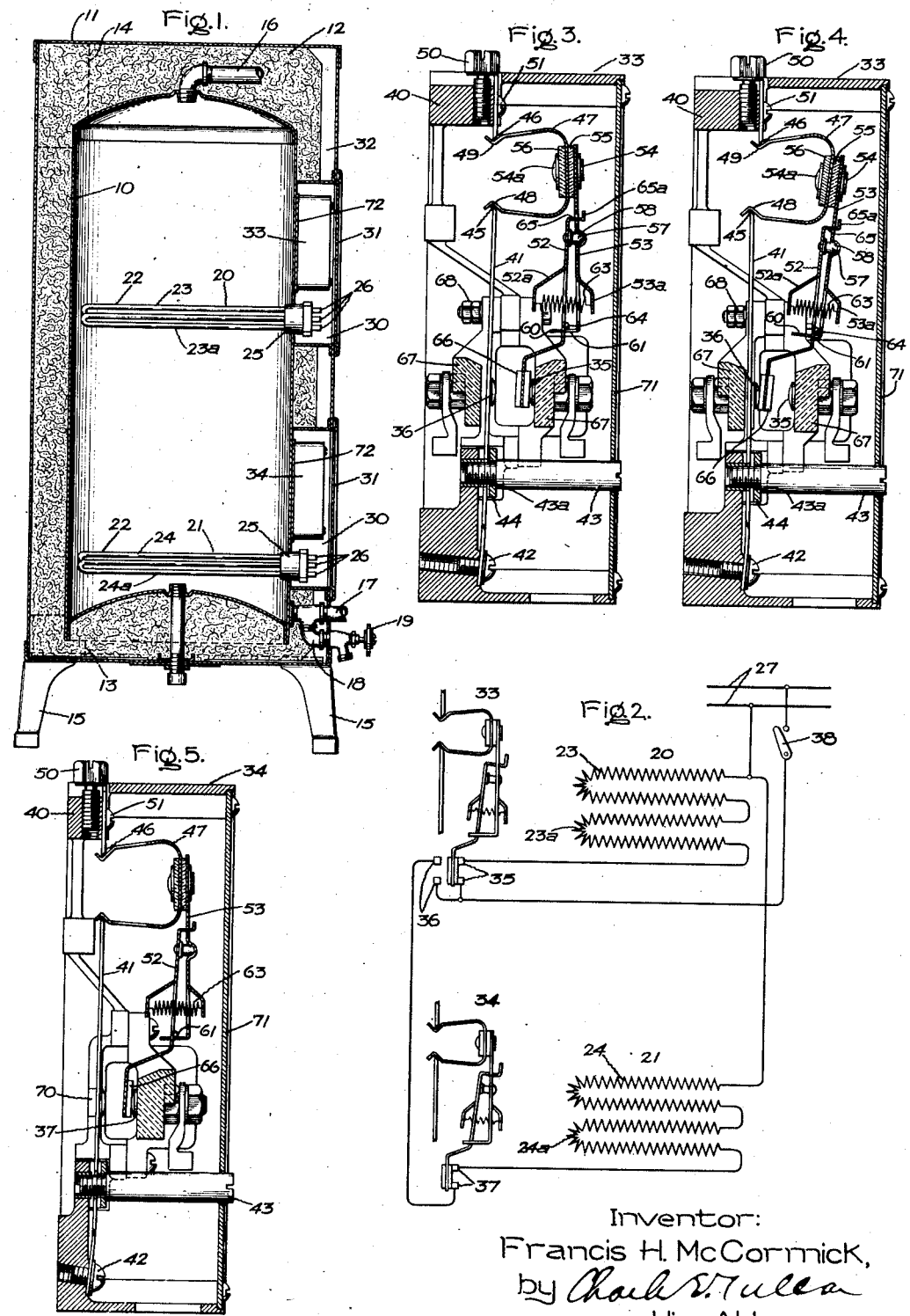
Inventor:
Francis H. McCormick,
by Charles E. Tullar
His Attorney.

Patented Dec. 27, 1932

1,892,557

UNITED STATES PATENT OFFICE

FRANCIS H. McCORMICK, OF GLEN ELLYN, ILLINOIS, ASSIGNOR TO EDISON GENERAL ELECTRIC APPLIANCE COMPANY, OF CHICAGO, ILLINOIS, A CORPORATION OF NEW YORK

LIQUID HEATER

Application filed August 11, 1930. Serial No. 474,320.

My invention relates to liquid heaters, more particularly to electrical water heaters, and has for its object the provision of an improved heater of this character.

More specifically, my invention relates to electrical water heaters particularly useful in connection with water heating systems such as are commonly used in dwellings and homes wherein the hot water demand consists of intermittent small quantities with an occasional use of relatively large amounts. In heating systems of this character it is desirable that water be heated and stored in quantities sufficiently large to meet both the ordinary daily needs and those heavy demands occasioned by the bath, the laundry, etc. It is also desirable that a supply of hot water be recuperated quickly, and be available for immediate use in case the hot water supply has been considerably depleted by reason of a rather heavy hot water consumption.

In one of its aspects, my invention contemplates the provision of simple, reliable and inexpensive means for economically heating and storing a relatively large quantity of water; and for automatically recuperating a supply of hot water within a relatively short period of time in the event a considerable quantity of hot water has been drawn off.

In carrying my invention into effect in one form thereof, I provide separate means for applying heat to the water in the upper and lower portions of a suitable water storage tank; and provide suitable means dependent upon the temperatures of the water in these portions for controlling the heating means so that if the water be cold, heat will first be applied so as to heat the water in the upper portion of the storage tank where it is available for immediate use to a suitable desired high temperature, after which heat will be applied to the water in the remaining portion of the tank so as to bring this water to the high temperature value.

Preferably, the means for applying heat to the water in the lower portion of the tank will be controlled so that it will be utilized to meet the usual hot water demands, the heating means for the upper portion being used only to recuperate quickly a quantity of hot water in the event there has been a material depletion in the hot water supply. By reason of this arrangement the heating means for the upper portion of the tank will be used only in the event the consumption of hot water is in excess of the recuperative effect of the heating means for the lower portion of the tank.

For a more complete understanding of my invention reference should be had to the accompanying drawing in which Fig. 1 is an elevation in section of a water heater embodying my invention; Fig. 2 is a diagrammatic representation of heating elements for the water heater shown in Fig. 1, together with a system of control therefor arranged in accordance with my invention; Fig. 3 is an elevation in section of a temperature responsive device used in the control of the heating elements; Fig. 4 is a view similar to Fig. 3 but illustrating the temperature responsive device in a different controlling position; and Fig. 5 is an elevation in section of another temperature responsive device used in controlling the heating elements.

Referring to the drawing, my invention in one form comprises a suitable metallic water storage tank 10 which is provided with a suitable outer enclosing metallic casing 11. As shown, the top, bottom and side walls of the tank 10 are surrounded with suitable heat insulating material 12, such as rock wool. Preferably, the tank 10 will be mounted in its enclosing casing 11 on supporting blocks 13 formed from suitable material having a low thermal conductivity, such as wood. Similar blocks 14 are positioned in the upper portion of the casing 11 so as to maintain the tank 10 in proper spaced relation with respect to its outer casing. The casing 11 together with the storage tank 10 is supported upon suitable legs 15. It is generally desirable that the water storage tank 10 be placed in a vertical position as shown, and that it have a relatively small diameter as compared with its height.

A hot water service pipe 16 communicates with the top of the storage tank 10; and a suitable inlet pipe 17 for cold water is located at the bottom of the tank so that the cold water will be delivered to the tank at a point very close to its bottom wall. A suitable outlet pipe 18 provided with a valve 19, connects with the cold water pipe 17 so that the tank may be drained.

I provide suitable means for applying heat to the water in the upper and lower portions of the storage tank 10. As shown, this heating means comprises a plurality of heating elements 20 and 21, the element 20 being located in the upper portion of the tank, while the element 21 is located in the lower portion of the tank. Preferably, the lower heating element 21 will be used to maintain the water in its heated condition so as to meet the ordinary hot water demands, while the upper heating element 20 will be used only to quickly recuperate a quantity of hot water in the event the supply has been depleted considerably, as by a continued use of hot water in excess of the recuperative effect of the lower heating element. Therefore, the element 20 will be positioned at some suitable distance from the top of the tank so that a suitable quantity of water, such for example as one-third of the tank capacity, will be available above the unit; while the element 21 will be positioned in the lower portion of the tank as close to its bottom wall as is practical. In order to enhance the rate at which the water in the upper portion of the storage tank is heated, the heating element 20 will have a comparatively large heating capacity, as for example 1000–2000 watts. The lower heating element may have a smaller capacity. Thus, this heating element may have a capacity of 500–750 watts. It is to be understood, however, that the lower heating element 21 usually will have a capacity sufficiently large to supply the normal day's hot water requirements without the necessity of resorting to the upper heating element.

Preferably and as shown, these heating elements 20 and 21 will be of the immersion type such as described and claimed in the United States patent to C. C. Abbott No. 1,522,992, dated January 13, 1925 and briefly, each element comprises a unit having an outer metallic sheath 22 in which a helical resistance conductor (not shown) is embedded in a compacted insulating material, such as magnesium oxide (not shown). It will be understood that such units can be bent easily into any desired shape. In the immersion heaters shown this unit is bent substantially in the form of a hair pin. Obviously, however, various other arrangements and configurations may be used. Preferably and as shown, the heating elements 20 and 21 will be provided with two hairpin heating units 23, 23a and 24, 24a respectively, each pair being connected in series relation (Fig. 2). Each heating element comprising the two hairpin units is provided with a screw supporting plug 25, and each is provided with suitable terminals 26 so that the units of each element can be electrically connected with each other and with a suitable source of electrical supply 27.

As thus constructed, the heating elements 20 and 21 are applied to the storage tank by inserting them through suitable apertures provided for them in the side wall of the tank, each aperture being provided with a threaded portion for receiving the screw plug portion 25 of the heating elements. In order to apply either heating element it is merely necessary to insert it through its aperture, and screw the plug support 25 into the threaded portion of the aperture; to remove the element it is merely necessary to unscrew the plug.

Suitable receptacles 30 are provided for receiving the terminals 26 of the heating elements 20 and 21 respectively. As shown, each of these receptacles communicates with the exterior of the enclosing casing 11, and is provided with a suitable cover member 31 which will be bolted or otherwise detachably secured to the enclosing casing. A suitable lead channel 32 located between the tank 10 and its casing 11 is provided for receiving suitable electrical supply conductors from the supply source 27. It will be understood that the lead channel will be in communication with each of the receptacles 30 so as to provide for the electrical connections.

While electrical heating elements of the immersion type have been shown, it will be understood, of course, that various other types may be used, thus, heating elements which are intended to apply heat to the exterior of the tank, such as heaters of the "clamp on" type, may be used.

As has been pointed out, it is contemplated that if the water in the tank be cold, or if the water attains a comparatively low temperature, as for example 130° F. the upper heating element 20 will be used to heat the water in the upper portion of the storage tank 10 to a suitable predetermined high temperature, such as 150° F., within a comparatively short interval of time, while the lower heating element 21 will be used to heat the water in the remaining portion of the tank to the predetermined high temperature, and moreover will maintain this temperature provided the hot water draw offs do not exceed a predetermined amount; if there be a comparatively heavy hot water consumption so that the supply of hot water is considerably depleted, the upper element 20 again will be used to quickly heat the water in the upper portion of the tank.

I control the energization of the heating elements 20 and 21 by suitable means dependent upon the temperature of the water in a storage tank 10. As shown, I have provided suitable thermostats 33 and 34 for this purpose. The thermostat 33 is located so that it responds to the temperature of the water in the upper portion of the tank, above the heating element 20, while the thermostat 34 is located so that it responds to the temperature of the water in the lower portion of the tank, above the heating element 21.

Referring to Fig. 2, it will be observed that the upper thermostat is of the double contact type, this thermostat being provided with two sets of controlling contacts 35 and 36 only one set of which can be closed at the same time. The lower thermostat 34 has only one set of contacts which are indicated by the numeral 37. It will be observed that when the thermostat 33 is in its position to close its right hand contacts 35, as shown in Fig. 2, the upper heating element 20 only will be energized, while if the thermostat be in its left-hand position to close the contacts 36, the lower element 21 only can be energized. In other words, it is impossible for both heating elements to be energized at the same time.

The thermostats 33 and 34 are so arranged that when the supply switch 38 is closed so as to connect the heating system with the source 27, and the water in the storage tank 10 is cold, the upper thermostat will be in its right hand position to close the contacts 35, while the lower thermostat will be in its position to close its contacts 37. It will be observed that the upper heating element 20 only will be energized at this time, and as a result the water in the upper portion of the storage tank above the heating element 20, that is, that portion of the water which is available for immediate use, will be heated first. This portion of the water will be heated at a comparatively rapid rate both because of the relatively small quantity of water being heated and because of the comparatively large capacity of the upper heating element 20.

As soon as this portion of the water attains the predetermined high temperature, which as has been pointed out, may be 150° F., the thermostat 33 opens its contacts 35 and closes its contacts 36. In other words, the heating element 20 will be disconnected from the source 27, and the heating element 21 will be connected with the source. The lower heating element 21 thereupon will operate to heat up the water in the remaining portion of the tank to substantially the predetermined high temperature so that the water throughout the tank will have a substantially uniform temperature. When the water in the tank has thus been heated uniformly the lower thermostat 34 will open its contacts to cut out the lower heating element.

If a quantity of hot water be withdrawn, cold water will be introduced into the lower portion of the tank by means of the inlet pipe 17, where it will remain without appreciable mixing by reason of its greater density. If the hot water be withdrawn in such quantities that the cold water line reaches the lower thermostat 34, this thermostat will be actuated so as to reenergize the lower heating element 21. The lower heating element thereupon will tend to recuperate a quantity of hot water sufficiently large to replace the hot water drawn off. When this has been effected, the heating element 21 will be disconnected. The lower heating element will thus be controlled to meet the normal hot water demands. If continued withdrawals deplete the hot water supply in the tank 10 at a greater rate than the lower heating element 21 recuperates it, the cold water line will gradually rise until finally it will reach the upper thermostat 33. The upper thermostat will then operate to reenergize upper heating element 20 and to deenergize the lower heating element 21. The upper element 20 will then operate to quickly heat the water in the upper portion of the tank to the high temperature value. When the water attains this temperature, the thermostat 33 will again be actuated so as to disconnect the heating element 20 and to reconnect the lower element 21.

During the normal operation of the heater, that is, when intermittent small quantities of hot water are being drawn off, it is quite likely that a certain amount of mixing between the water in the upper and lower portions of the tank will take place by reason of the convection currents set up by the lower heating element. As a result, the water in the upper portion of the tank probably will have a temperature of about 145° F. This temperature, however, ordinarily will be quite uniform. The water in the lower portion of the tank during the normal operation quite likely will be cold. At some point between the upper and lower portions of the tank there will be a relatively sharp break in temperature.

The thermostats 33 and 34 form no part of my present invention and may have any suitable construction, but preferably will have a construction similar to the temperature control device described and claimed in United States patent to A. H. Simmons No. 1,743,073 dated January 7, 1930, and will have the specific construction of one form of the temperature control device described and claimed in my copending application, Serial No. 575,593, filed November 17, 1931. Referring to Figs. 3 and 4, the thermostat 33 comprises a base or supporting member 40 formed from a suitable metallic material such as aluminum. A suitable thermostat shown as a bi-metallic bar 41 made of two strips of metal having dissimilar temperature coefficients of expansion, such as brass and steel, these strips being securely braced or welded together lengthwise, is mounted on the support 40. As shown, the bar 41 is rigidly secured at one end to the support 40 by means of a clamping screw 42 passed through an aperture provided for it in the bar. An adjustment screw 43 is provided near the fixed end of the bar; this screw is passed through a suitable aperture provided for it in the bar 41 and is threaded in the support 40. The adjusting screw 43 has a shoulder 43a which bears against a suitable thrust plate 44. It will be understood that this thrust plate may be moved toward the bar 41 or away from the bar by the operation of the adjusting screw 43 and thereby change the setting of the thermostat.

The movable end of the thermostat bar 41 is provided with a knife-edge bearing 45. Between this bearing and a similar bearing 46 attached to the support 40 is interposed an inverted U-shaped resilient member or spring 47. As shown, one arm of this spring has a bearing seat 48 which receives the knife-edge bearing 45 on the bar 41, while its other arm has a similar bearing seat 49 which receives the knife-edge bearing 46. The knife-edge bearing 46 is adjustable, a suitable adjusting screw 50 being provided for this purpose. It will be understood that the bearing 46 is mounted to slide on the base 40, and is secured thereon by means of a pair of screws 51 (only one of which is shown) disposed on opposite sides of the bearing so that their heads overlap the edge portions of the bearing 46.

The bearing 46 lies in the plane of movement of the thermostat bar 41 in such a position that at a predetermined temperature the knife-edge bearing 45 on the bar 41 will lie on a line passing through the bearing 46, to the effective point of support on the bar 41, which as will be observed is the position of the thrust plate 44. This is the neutral position of the thermostat bar. Thus, the adjusting screw 43 holds the thrust plate 44 in engagement with the adjacent side of the thermostat bar and holds the bar depressed against the resiliency of the bar so that all distortion of the bar takes place in that portion between the adjusting screw and the movable end of the thermostat. Consequently when the thrust plate 44 is held in engagement with the thermostat bar, the position of the adjusting screw is in effect the point of support of the bar so that the neutral position is defined by a line passing through the knife-edge bearing 46 and the point of engagement between the thrust plate 44 and the bar.

It will be observed that the arms of the resilient spring member 47 tend to separate by reason of the resiliency of the member, these arms being compressed between the bearings 45 and 46 whereby the member 47 exerts a force on the movable end of the thermostat bar, which force tends to hold the movable end on one side or the other of the neutral position. In the neutral position the entire force exerted by the spring member 47 is in the direction of the point of support of the thermostat against the thrust plate 44. In other words, the force exerted by the spring member in the neutral position is lengthwise of the thermostat, the lateral component of this force being zero. However, when the thermostat moves from the neutral position in either direction, a lateral component of this spring pressure is produced tending to force the thermostat away from the neutral position, this lateral component increasing as the thermostat moves away from the neutral position.

Thus far the construction of the thermostat 33 is substantially the same as that described and claimed in the above mentioned Simmons Patent No. 1,743,073. The switch provided for the thermostat 33, however, instead of being arranged as shown in the Simmons patent, preferably will comprise a suitable switch arm 52 which is pivotally secured to an actuating arm 53. This latter arm is secured to the spring member 47 by means of suitable rivets 54 (only one of which is shown), a block 55 of suitable insulating material, such as fibre, being interposed between the arm 53 and the spring; a similar block 56 of insulating material is placed between the other side of the spring and the rivet heads 54a.

The switch arm 52 is pivotally secured or hinged at one end to the fixed end portion of the actuating arm 53 so as to provide for limited relative movement between these members. As shown the switch arm 52 is provided with a button-like bearing member 57 rigidly secured to the arm, and received in a suitable seat 58 provided for it in the operating arm 53. It will be observed that the bearing member 57 is sufficiently long to provide for a relatively large angular movement between the switch arm 52 and its actuating arm 53. The free end of the actuating arm 53 is provided with a portion 60 projecting at right angles from the body of the arm toward the base member 40. This projecting portion as shown embraces the intermediate portion of the switch arm 52, and, as will be observed, the aperture or slot 61 provided in this projecting portion for receiving the switch arm is sufficiently long to provide for a considerable angular movement between the arms 52 and 53.

A suitable tension spring 63 is provided for biasing the arms 52 and 53 together. As shown, the ends of this spring are secured to intermediate portions 52a and 53a of the bars 52 and 53 respectively. These portions as shown are struck outwardly in opposite directions from the material forming the arms. These portions 52a, 53a need not be formed integrally with the arms 52, 53 but may be separate members secured to the arms in any suitable manner. It will be observed that the tension spring 63 tends to bias the arms together. A suitable bead-like stop 64 formed upon or otherwise secured to the switch arm 52 is provided to limit the movement of the arms toward each other.

The pivoted end portion of the switch arm 52 is provided with a portion 65 projecting outwardly at right angles from the body of the arm, this portion being embraced by the actuating arm 53. The projecting portion 65 in turn is provided with a portion 65a projecting at substantially right angles therefrom. It will be observed that when the arms 52 and 53 are assembled, the projecting portion 65a forms a locking tongue between these members so that while a limited angular motion is permitted between the arms, it will be impossible for the pivoted end of the switch arm to become detached.

On its free end the switch arm 52 carries a bridging contact 66 which cooperates with the two sets of contacts 35 and 36 (only one contact of each set being shown in Figs. 3 and 4). These contacts 35 and 36 are fixedly secured to an electrical insulating supporting member 67 secured to the base 40 by any suitable means, such as the screw fastening means 68. It will be observed that the loose connection provided between the switch arm 52 and its actuating arm 53 allows the bridging contact 66 to adjust itself so as to engage both of the contacts of either set 35, 36.

In the operation of the temperature control device 33, the switch arm 52 and its actuating arm 53 are held toward the right, as viewed in Figs. 3 and 4, by the spring 47 so as to hold the bridging contact 66 in engagement with the fixed contacts 35 as long as the temperature is below the predetermined maximum temperature. In this closed position of the thermostat, as shown in Fig. 3, the arms 52 and 53 will be separated against the force exerted by the tension spring 63 to the maximum extent permitted by the aperture or slot 61. Under these conditions the movable end of the thermostatic bar 41 is situated to the right of the neutral position, that is, to the right of a line joining the knife-edge bearing 46 with the point of engagement between the thermostat bar and the thrust plate 44. As the temperature increases the distortion of the thermostat bar tends to move its free end toward the base 40, but this movement is resisted by the resilient member 47. Upon the occurrence of the predetermined maximum temperature for which the thermostat is set, however, the thermostat overcomes the lateral component of the force exerted by the spring member 47 and starts to move toward the base. As soon as the thermostat thus starts to move the opposing force exerted by the spring 47 begins to decrease, and the spring 47, therefore, decreasingly resists the movement of the thermostat. As a result the thermostat rapidly accelerates and moves at high speed through the neutral position to the opposite side thereof. As soon as the thermostat bar has passed through the neutral position, it will be observed that its movement will be assisted by the increasing lateral component of force applied by the spring 47. This operation results in a quick opening of the fixed contacts 35, the bridging contact 66 being thrown toward the left so as to disengage the contacts 35 and to engage the contacts 36 (Fig. 4) with a snap action. This snap action is further assured by the flexible connection between the switch arm 52 and its actuating arm 53. As has been pointed out, in the closed position shown in Fig. 3, the switch arm 52 is separated from its actuating arm 53 to the maximum extent permitted by the slot 61. This results because the bridging contact 66 engages the fixed contacts 35 before the thermostat bar 41 has reached its normally closed circuit position for the fixed contacts 35. As a result of this arrangement the bridging contact is held in contact with the fixed contacts 35 by means of the tension spring 63 during the initial slow movement of the thermostat, and this initial movement, therefore, is thus absorbed so that the thermostat has an opportunity to accelerate to a high speed before the right hand edge of the slot 61, provided in the actuating arm 53, engages the switch arm to move the bridging contact away from the contacts 35.

If the temperature begins to decrease, the distortion of the thermostat bar 41 tends to move the bridging contact 66 back to its position to close the contacts 35 as shown in Fig. 3, but its movement is opposed as before by the force exerted by the spring member 47, until such time as the spring member 47 is overcome at some predetermined minimum temperature when the thermostat will snap to open the contacts 36 and close the contacts 35. It will be observed that the switch arm 52 and the contact arm 53 are in effect a single arm when the thermostat is in its position to close the fixed contacts 36 as shown in Fig. 4. In other words, the tension spring 63 does not serve in this case to absorb the initial slow motion of the thermostat 41 as it moves to open the contacts 36. The arms 52 and 53 however will generally be sufficiently resilient so that the fixed contacts 36 will remain closed until the thermostat 41 is accelerating through its neutral position.

The lower thermostat 34, shown in Fig. 5, has identically the same construction as the upper thermostat 33 except that it is provided with only one set of fixed contacts, namely the contacts 37. Instead of another set of fixed contacts, the lower thermostat is merely provided with a member 70 which serves to limit the motion of the thermostat toward the base. Thus the thermostat 34 is provided with a thermostat actuating member 41, a knife-edge bearing 46 secured to the base 40 and a U-shaped spring 47 interposed between the actuating bar and the knife-edge bearing. This thermostat is also provided with a switch arm 52 loosely mounted upon and resiliently connected to an actuating arm 53. The construction of these elements is identical with the construction of the corresponding elements of the thermostat 33. The bridging contact 66 carried by the switch arm 52, however, cooperates with but one set of fixed contacts 37. Each of the thermostats 33 and 34 is provided with a suitable metallic cover member 71.

A seat member 72 for the upper thermostat 33 is welded or otherwise suitably secured to the upper portion of the side wall of the tank 10. The base 40 of the thermostat 33 is secured to the seat 72 by screw fastening means (not shown) or by any other suitable means. The thermostat 34 is similarly mounted on the lower side wall of the tank.

In the operation of the water heating apparatus, the main switch 38 being closed causes the upper heating element 20 to be energized to heat the water in the upper portion of the tank until it has reached the predetermined maximum temperature of 150° F., and since there is no circulation below the heating element 20 the thermostat will be operated to open the energizing circuit for the element 20 and to close the energizing circuit for the element 21 when the water above the unit 20 has been heated to the maximum temperature.

After this portion of the water has thus been heated to the maximum temperature and the thermostat 33 has operated to disconnect the heating element 20 from the supply source and to connect the heating element 21 to the source, the water in the remaining portion of the tank will be heated to the predetermined maximum temperature whereupon the thermostat 34 will operate to disconnect the heating unit 21. As soon as a quantity of hot water has been drawn off sufficient to cause the cold water line to reach the lower thermostat, the lower heating element 21 will be reenergized. If continued withdrawals of hot water deplete the hot water supply in the tank 10 faster than the lower heating element recuperates it, the cold water line will gradually rise until the upper thermostat will be actuated so as to energize the upper heating element 20 and to disconnect the lower element 21. The heating element 20 being of comparatively large capacity will quickly bring the water in the upper portion of the tank to the maximum temperature. This portion of the water, it will be observed is available for immediate use, and thus a quantity of hot water is insured at all times. In this manner the lower heating element 21 performs the function of maintaining the hot water supply, except in case of continued hot water draw offs in excess of its recuperative effect, in which event the high capacity upper heating element 20 will be called upon to quickly recuperate a supply of hot water.

It will be observed that by reason of the above control for the heating elements, the average heating demand is imposed on the lower unit. Thus, the heating system gives a very long high load factor load for the central station. By properly proportioning the capacity of the lower heating element to the size of the tank and to the amount of hot water required it is possible to secure practically a twenty-four hour load for the central station for the lower unit. The additional demand imposed by the upper unit which comes into use only when the hot water is nearing depletion, will have no appreciable effect on the central station load due to the diversity of these demands.

While I have shown a particular embodiment of my invention it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A liquid heater comprising a tank, means for applying heat to different portions of said tank, means dependent upon the temperature of the liquid in one of said portions for controlling said heating means so that said heating means applies heat to said different portions selectively, and means dependent upon the temperatures of the liquid in said portions respectively for controlling said heating means so as to render the heating means for each portion ineffective when the liquid in that portion has attained a predetermined high temperature.

2. A liquid heater comprising a tank, heating means for the upper portion of said tank, heating means for the lower portion of said tank, and means responsive to the temperature of the liquid in the upper portion of said tank for controlling both of said heating means so that when the liquid in said upper portion has attained a predetermined high temperature the heating means for said portion is rendered ineffective and the heating means for said lower portion is rendered effective.

3. An electric liquid heater comprising a tank, electrical heating means for heating the liquid in the upper portion of said tank, electrical heating means for heating the liquid in the lower portion of said tank, means responsive to the temperatures of the liquid in the upper portion of said tank for controlling both of said heating means so that when the liquid in said upper portion has attained a predetermined high temperature the heating means for said upper portion is disconnected and the heating means for said lower portion is rendered effective, and means responsive to the temperature of the liquid in the lower portion of said tank for controlling the lower heating means so that said heating means is disconnected when the liquid in said lower portion attains a predetermined high temperature.

4. An electric water heater comprising a tank, an electrical heating element for the upper portion of said tank, a second electrical heating element for the lower portion of said tank, means responsive to the temperature of the water in the upper portion of said tank for controlling both of said heating elements and means responsive to the temperature of the water in the lower portion of said tank for controlling said second heating element.

5. An electric water heater comprising a tank, an electrical heating element for the upper portion of said tank, a second electrical heating element for the lower portion of said tank, means responsive to the temperature of the water in the upper portion of said tank for controlling both of said heating elements so that said upper element is deenergized and said lower element is energized when the temperature of the water in said upper portion has attained a predetermined high value, and a temperature cut out for said lower element responsive to the temperature of the water in the lower portion of said tank.

6. An electric liquid heater comprising a storage tank, a heating element of relatively large capacity for applying heat to the upper portion of said tank so as to heat a comparatively small quantity of water within a comparatively short interval of time, a second heating element of low capacity as compared with the capacity of the upper heating element for applying heating to the lower portion of said tank, means dependent upon the temperature of the water in the upper portion of said tank for controlling both of said heating elements so that said upper element is deenergized and said lower element is energized when the temperature of the water in said upper portion has attained a predetermined high value, and a temperature cut out dependent upon the temperature of the liquid in the lower portion of said tank for deenergizing said lower heating element when the temperature of the water in said lower portion has attained substantially said predetermined high value.

7. A water heater comprising a storage tank, a hot water draw off at the upper portion of said tank, a cold water inlet at the lower portion of said tank, means for applying heat to the upper and lower portions of said tank, means responsive to the temperatures of the water in said upper and lower portions for controlling said heating means so that in the event the cold water line reaches a predetermined level heat is applied only to the lower portion of said tank and in the event the cold water line reaches a higher predetermined level heat is applied only to the upper portion of said tank.

8. An electric water heater comprising a tank, an electrical heating element for the upper portion of said tank, an electrical heating element for the lower portion of said tank, means responsive to the temperature of the liquid in said upper portion for controlling both of said heating elements so that said upper element is deenergized and said lower element is energized when the water in said upper portion attains a predetermined high temperature, and upon the water in said portion attaining a predetermined low temperature said upper element is energized and the lower element is deenergized, and a temperature cut out responsive to the temperature of the water in the lower portion of said tank for shutting off said lower heating element when the temperature of the water in said lower portion attains a predetermined high value.

9. An electric water heater comprising a tank, an electrical heating element for the upper portion of said tank, an electrical heating element for the lower portion of said tank, thermostatic means responsive to the temperatures of the water in said upper and lower portions for controlling said heating elements so that when the temperature of the water in the upper portion of said tank reaches a predetermined low value said upper unit is energized so as to heat the water in the upper portion of said tank to a predetermined high value whereupon said element is deenergized and said lower element is energized to heat the water in the lower portion of said tank to substantially said predetermined high value whereupon said lower element is deenergized, and upon the water in the lower portion of said tank attaining a predetermined low temperature said lower element is reenergized.

10. An electric water heater comprising a tank, a hot water draw off communicating with the upper portion of said tank, a cold water inlet communicating with the lower portion of said tank, an electrical heating element in the upper portion of said tank, an electrical heating element of lower capacity in the lower portion of said tank, and means comprising a temperature device responsive to the temperature of the water above said upper heating element, and a temperature device responsive to the temperature of the water above said lower heating element for controlling the energizing circuits for both of said heating elements so that in the event such a quantity of hot water be drawn off that the cold water level reaches said lower temperature responsive device, said lower element will be energized so as to recuperate a supply of hot water to replace that withdrawn, and in the event the hot water draw offs exceed the recuperating capacity of said lower heating element so that the cold water line reaches said upper temperature responsive device, said lower heating element will be deenergized and said upper heating element will be energized so as to quickly recuperate a supply of hot water in the upper portion of said tank.

11. A water heater comprising a storage tank, a hot water draw off at the upper portion of said tank, a cold water inlet at the lower portion of said tank, means for applying heat to the upper and lower portions of said tank, means responsive to the temperature of the water in said upper and lower portions for controlling said heating means so that while the hot water consumption does not exceed a predetermined rate, heat is applied only to the lower portion of said tank so as to maintain the hot water supply, but in the event the hot water consumption exceeds said predetermined rate, heat is applied only to the upper portion of said tank so as to heat that portion of the water which is available for immediate use.

In witness whereof, I have hereunto set my hand this 25th day of July, 1930.

FRANCIS H. McCORMICK.

DISCLAIMER 1,892,557.—*Francis H. McCormick*, Glen Ellyn, Ill. LIQUID HEATER. Patent dated December 27, 1932. Disclaimer filed August 1, 1934, by the assignee, *Edison General Electric Appliance Company*.

Hereby disclaims the subject matter of claims 1, 2, 3, 4, 5, 7, 8, 9, and 11.
[*Official Gazette August 28, 1934.*]